No. 859,091. PATENTED JULY 2, 1907.
A. H. MARKS.
BATTERY CELL.
APPLICATION FILED SEPT. 12, 1906.
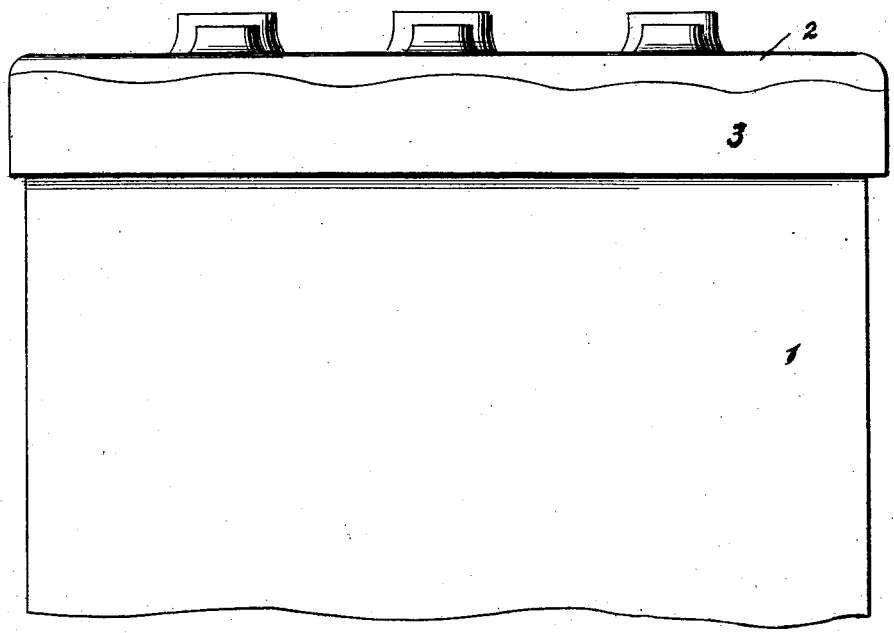
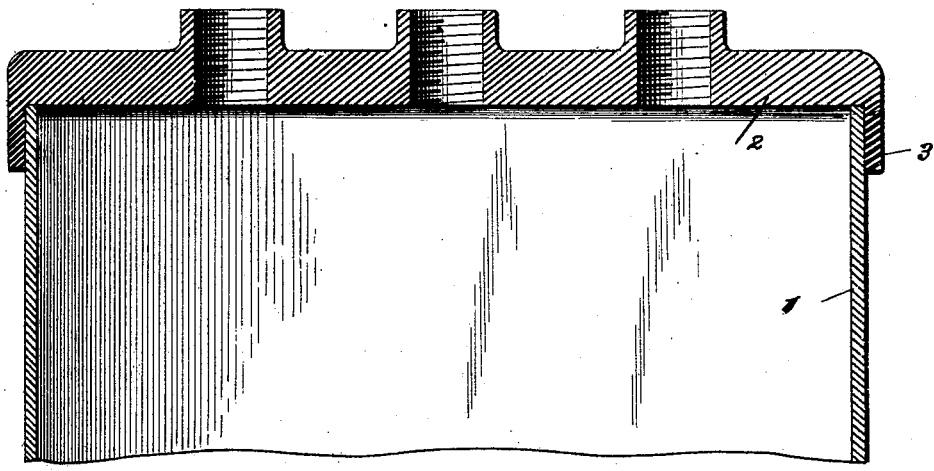

UNITED STATES PATENT OFFICE.

ARTHUR H. MARKS, OF AKRON, OHIO.

BATTERY-CELL.

No. 859,091.      Specification of Letters Patent.      Patented July 2, 1907.

Application filed September 12, 1906. Serial No. 334,346.

*To all whom it may concern:*

Be it known that I, ARTHUR HUDSON MARKS, a citizen of the United States, residing at Akron, in the county of Summit and State of Ohio, have invented certain new and useful Improvements in Battery-Cells, of which the following is a specification.

This invention relates to battery cells or boxes, and particularly to the covers of the same, and the object is to provide a cover, the retaining flange of which is so constructed that it will not crack or break while in use.

With the above object in view, the invention consists in the novel features of construction hereinafter fully described, particularly pointed out in the claims, and clearly illustrated by the accompanying drawing, in which, Figure 1 is a side elevation of a portion of a battery cell provided with a cover constructed in accordance with my invention; and Fig. 2, a sectional view of the same.

Referring now more particularly to the drawings, 1 indicates a cell and 2, the cover, the major portion of which is of the usual construction, being a substantially rigid plate. My invention consists in providing a yielding or flexible flange 3 extending entirely around the edge of the plate to inclose the open end of the battery box or cell. This flange is formed of soft rubber, united to the rigid plate by vulcanization.

In the ordinary cover having a rigid flange formed of hard rubber, there is considerable loss, due to the cracking or breaking of the flange while in use. By the use of my improved cover, this objectionable feature is obviated, and at the same time, a cover is provided which will fit snugly the open end of the battery box.

Having thus fully described my invention, what I claim as new, and desire to secure by Letters Patent of the United States, is:—

1. A cover for battery cells or boxes consisting of a substantially rigid plate having a soft rubber flange about its edge and depending therefrom to inclose the upper end of the battery box.

2. A cover for battery cells or boxes comprising a substantially rigid plate formed of hard rubber and a continuous flange of soft rubber extending along the entire edge thereof, and depending therefrom to inclose the upper end of the battery box or cell.

3. A battery cell or jar comprising a body portion of hard rubber, and a cover having its major portion formed of hard rubber, having a continuous flange about its edge depending therefrom to inclose the upper end of the body portion and formed of soft rubber united to the main portion of the cover by vulcanization.

4. A battery jar or receptacle having a body portion of hard rubber and a cover consisting of a plate having a continuous depending flange to inclose the upper end of the body portion of the jar, said plates and flanges being composed of vulcanized materials of different compositions, that composing the plate being hard and that composing the flange soft, for the purpose set forth.

In testimony whereof I affix my signature in presence of two witnesses.

ARTHUR H. MARKS.

Witnesses:
    I. R. BAILEY,
    H. G. HAYES.